Sept. 14, 1954 J. P. ALOISIO 2,689,320
MOTOR SPEED CONTROL SYSTEM
Filed June 20, 1952 2 Sheets-Sheet 1

INVENTOR
JOSEPH P. ALOISIO
BY Elmer J. Gorn
ATTORNEY

Sept. 14, 1954
J. P. ALOISIO
2,689,320
MOTOR SPEED CONTROL SYSTEM
Filed June 20, 1952
2 Sheets-Sheet 2
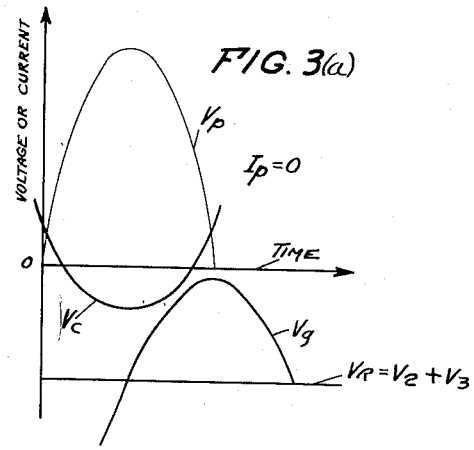
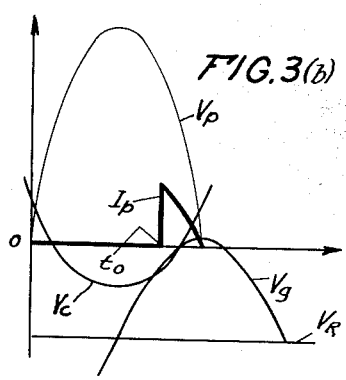
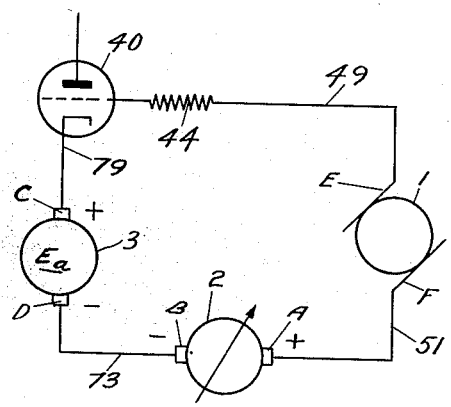
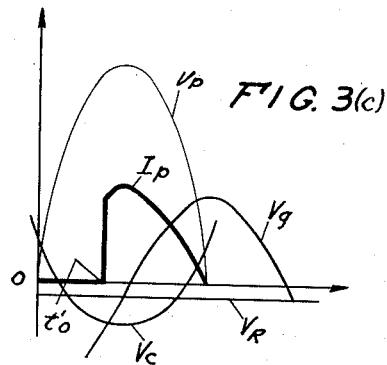
INVENTOR
JOSEPH P. ALOISIO
BY Elmer J. Gorn
ATTORNEY Patented Sept. 14, 1954

2,689,320

UNITED STATES PATENT OFFICE 2,689,320

MOTOR SPEED CONTROL SYSTEM

Joseph P. Aloisio, Somerville, Mass., assignor to Raytheon Manufacturing Company, Newton, Mass., a corporation of Delaware Application June 20, 1952, Serial No. 294,617

5 Claims. (Cl. 318—317)

1

This invention concerns a motor control system for maintaining substantially constant the speed of a direct current motor at any predetermined value within the speed range.

In the subject invention, an adjustable voltage is applied to a direct current motor through a rectifier whose input terminals are connected to an alternating current source in series with the alternating current winding of a saturable reactor. Across the terminals of the alternating current source, a primary winding of a transformer is connected; this transformer has three secondary windings for providing three separate alternating current supply voltages. The first and second of these secondary windings serve as sources of alternating current plate voltage and filament voltage, respectively, for a gaseous electron discharge control device. The saturable reactor includes a control winding which is connected in series with said first transformer secondary winding in the plate or output circuit of said control device.

The input or control grid circuit for said control device comprises three serially-connected sources of input voltage. The first source of input voltage is obtained by inserting a phase shifter across said second transformer secondary winding to produce an alternating current voltage which is shifted in phase ninety degrees relative to said plate voltage.

A second source of input voltage is derived from a reference circuit including said third secondary winding, a rectifier in series with said winding and a variable motor speed control potentiometer connected across both.

A third source of input voltage is derived from a circuit associated with said motor armature; this circuit is so designed that a direct-current voltage derived therefrom is substantially proportional to the back electromotive force and, hence, to the speed of said motor.

The three sources of input voltage are connected in series between cathode and grid of the control device and are effective in controlling the plate current and thus the current through said control winding of the saturable reactor. As is well known, the permeability of the core of a saturable core reactor is a function of the degree of magnetization. For instance, as the plate current or the current flowing through the control winding increases, the magnetization of the core increases and the impedance of the alternating current or reactance winding of the saturable core reactor decreases. Similarly, if the control current were to decrease, the impedance of the

2 alternating current winding would increase. Because of this change in impedance of the alternating current winding, the voltage appearing across the alternating current winding varies and a different proportion of the voltage of the alternating current source appears across the input terminals of the rectifier. In this way, the rectified voltage applied to the motor armature is varied in such manner as to maintain the motor speed constant.

A feed-back winding is also provided on the saturable core reactor in series with the motor armature across the output terminals of the rectifier. As the motor load or motor speed varies, the current flow in this feed-back winding varies to enhance the control action provided by the control winding.

In the drawings:

Fig. 2 illustrates an equivalent circuit of the input circuit of the electron discharge control device used in the circuit of Fig. 1; and Fig. 3 illustrates certain operating characteristics of the subject invention.

Figure 1:
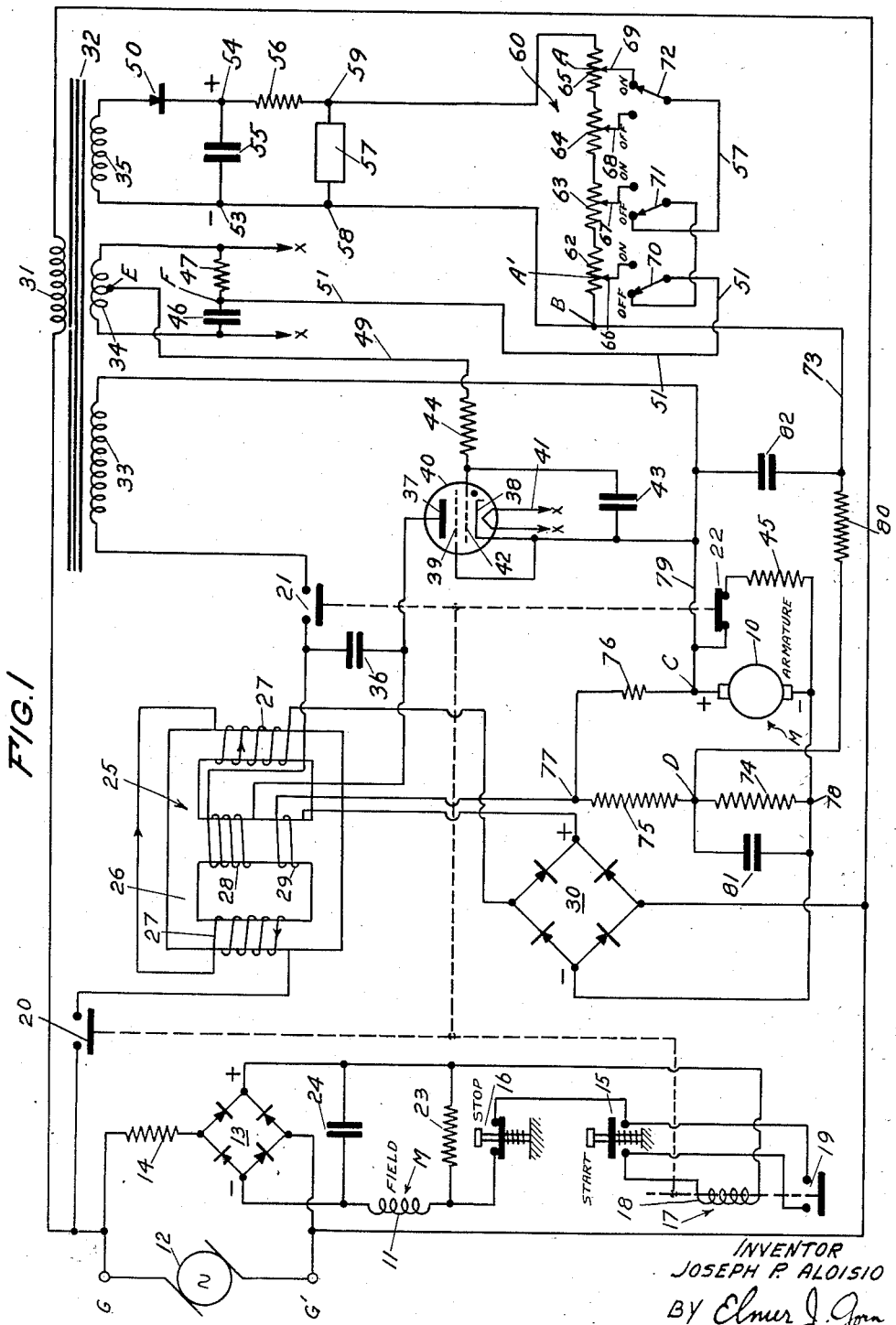
Fig. 1 is a schematic circuit diagram illustrating an embodiment of the subject invention.

Referring now to Fig. 1 of the drawings, the direct current motor M, whose speed is to be controlled, comprises an armature 10 and a field winding 11. An alternating current supply, such as a local generator 12 of a conventional alternating current supply line, serves as a source of alternating current supply voltage across whose terminals GG' an output voltage of approximately 220 volts at a frequency of sixty cycles per second is derived. This output voltage, of course, depends upon the voltage at which the motor is to operate, and, in the present instance, is suitable for a motor operating at 115 volts direct current. The frequency may be any desired value. The field winding 11 is energized by a circuit including a conventional full-wave rectifier 13 having its alternating current input terminals connected across terminals GG' through a voltage-dropping resistor 14. The field winding 11 of the motor is located in the output or direct current circuit of rectifier 13 in series with resistor 23. Also in the output of rectifier 13 are a Start switch 15, a Stop switch 16 and a relay 17 comprising relay coil 18, holding contacts 19 and contacts 20, 21 and 22. The purpose of contacts 20 to 22 will be described later.

The field circuit arrangement is such that the field 11 is energized through resistor 23 upon the application of line voltage. Condenser 24 serves as a filter in the output of rectifier 13. The Start switch 15 is spring biased in the open position while Stop switch 16 is spring biased in the closed position, as shown in Fig. 1. When Start switch 15 is depressed, current flow through relay coil 18 is established. Upon release of Start switch 15, holding contacts 19 complete the relay circuit such that the relay remains energized. Depressing Stop switch 16 interrupts the relay circuit, de-energizing relay 17. This places contacts 19 in their normally open position such that, upon releasing the Stop switch, the relay remains deenergized.

A saturable reactor or magnetic amplifier 25 is shown having a conventional three-legged core structure 26, such as shown in U. S. Patent No. 2,175,379 to Dellenbaugh, Jr., and made up of a plurality of laminations of magnetic material, such as steel of high permeability. Saturable reactor 25, however, need not be limited to the precise form shown in the drawing. The main or alternating current winding 27 of reactor 25 has an equal number of turns wound in opposite fashion about each of the outer legs of said reactor. With this arrangement, the flux produced by the turns on each outer leg is equal and opposite in direction so that the resultant flux at the fundamental frequency produced in the center leg of core 26 is practically zero. The harmonics, being of small amplitude compared with the fundamental, may be ignored in practice. The center leg of reactor core 26 contains a control winding 28 and a feed-back winding 29 whose purpose will be described later. Reactance winding 27 is connected through contacts 20 in series with the input terminals of full-wave rectifier 30 across the alternating current supply terminals GG'. The rectifiers making up the full-wave rectifier 30 are shown as dry-contact rectifiers, although other types, such as diodes, may be used. The output terminals of rectifier 30 are connected to armature 10 of motor M in series with said feed-back winding 29.

A primary winding 31 of a transformer 32, which may be a conventional power supply transformer, is connected directly across alternating current supply terminals GG'. Transformer 32 also includes three secondary windings 33, 34 and 35. One end of secondary winding 33 of transformer 32 is connected through contacts 21 to one end of control winding 28. The other end of control winding 28 is connected to the plate 37 of a gaseous electron discharge device or control tube 40 which preferably is a typical hot cathode gas tube of the type commonly known as a thyratron. The tube may, of course, be of the indirectly heated type and may even be a hard vacuum tube. The other end of secondary winding 33 is connected to the cathode 38 of said control tube. Secondary winding 33 thus serves to supply plate voltage to control tube 40. A capacitor 36 connected in parallel with control winding 28 reduces or minimizes the inductive effects of the control winding. The number two grid 39 of control tube 40 may be connected to cathode 38, as shown in Fig. 1. The latter is heated in a conventional manner by filament 41. The control grid 42 of tube 40 is connected to cathode 38 by capacitor 43. A current-limiting resistor 44 is connected to control grid 42 and forms part of the control grid circuit to be described subsequently.

Returning now to a description of contacts 20 to 22, contacts 20 are adapted to be opened so long as relay 17 is deenergized, thereby preventing application of direct current voltage to motor armature 10 in the absence of current in field winding 11. Contacts 21 are biased open during de-energization of relay 17 to prevent application of plate voltage to control tube 40 during the absence of any direct current opposing voltage derived from armature 10 of the motor and thereby preventing excessive current flow in tube 40. Contacts 22 are biased open when coil 18 of relay 17 is energized, that is, when the motor is running. When it is desired to stop the motor, armature 10 may be braked by means of dynamic braking resistor 45, which is connected across armature 10 when the Stop switch 16 is depressed and coil 18 of relay deenergized. The number of revolutions of the motor shaft in which braking may be accomplished is dependent upon the value of resistor 45. For example, if the value of resistor 45 is decreased, the current flowing during the braking period is increased and the braking thereby accomplished more rapidly.

Secondary winding 34 serves a dual function. Firstly, it provides filament voltage for filament 41 of tube 40; secondly, winding 34 serves as a source of voltage for the phase-shifting circuit appearing in the grid-cathode or input circuit of tube 40. A capacitor 46 and resistor 47 serially connected across winding 34 serve as a ninety degree phase-shifting network. The midpoint E of winding 34 is connected to grid resistor 44 by way of lead 49, while a lead 51 is connected to the junction point F of phase-shifting network, as shown in Fig. 1.

A rectifier 50 is connected to secondary winding 35 of transformer 32 to provide a direct current voltage at the terminals 53, 54 whose polarity is as indicated in Fig. 1. A filter capacitor 55 is connected across terminals 53 and 54 to by-pass any ripple voltage that may be present in the output circuit of rectifier 50. Resistor 56 and a varistor 57, which may be made of thyrite, form a voltage dividing and regulating network to provide a constant direct current reference voltage across terminals 58 and 59. The resistance of a varistor is inversely proportional to the voltage thereacross. If, for instance, the voltage in transformer secondary 35 tends to increase, the resistance of varistor 57 tends to decrease, a greater proportion of the secondary voltage tends to appear across resistor 56 and the voltage appearing across terminals 58 and 59 is thereby maintained substantially constant.

A speed control potentiometer unit 60 comprises a plurality of serially-connected potentiometers 62 to 65, inclusive, with corresponding adjustable arms 66 through 69, respectively. A series of microswitches 70, 71 and 72 operated by cams (not shown) in accordance with a desired sequence of motor speeds cooperates with various ones or all of the potentiometers 62 to 65, depending upon which microswitch is closed by the cam. For example, with the microswitches in the position shown in Fig. 1, lead 51 is connected through microswitches 70, 71 and 72 to a point A on potentiometer unit 60. If switch 70 were actuated by its corresponding cam and were, therefore, in the "on" position, the other switches being in the "off" position, as shown, lead 51 would now be connected through microswitch 70 and potentiometer arm 66 to a point A' on potentiometer assembly 60. One end of a lead 73 is connected to point B, as shown in Fig. 1.

As previously stated, armature 10 of motor M is connected across the output terminals of rectifier 30. As is well known to those skilled in the motor art, the speed $n$ of a motor is given by $$n = K\frac{E_a}{\phi} = K\frac{V_T - I_a R_a}{\phi} \quad (1)$$

where $E_a$ is the counter electromotive force or armature voltage, $V_T$ is the armature terminal voltage, $I_a$ is the armature current, $R_a$ is the armature resistance, $\phi$ is the strength of the magnetic field and $K$ is a constant. Since $\phi$, which is directly proportional to the current flowing in motor field winding 11, can be kept substantially constant, it is evident that the equation for motor speed may be written as $$n = K'E_a = K'(V_T - I_a R_a) \quad (2)$$

Referring now to Fig. 1, a circuit is shown from which a voltage may be derived which is proportional to the back E. M. F. of the motor. This circuit comprises resistors 74, 75 and 76. If series resistor 76 is considered as part of the motor armature resistance, the voltage between points 77 and 78, and thus the voltage across resistor 75, are proportional to the motor terminal voltage $V_T$. The voltage across resistor 76 is proportional to the armature resistance drop $I_a R_a$ in the motor. When the values of resistors 74 and 75 are properly adjusted, the difference between the aforesaid voltages, that is, a voltage proportional to $E_a$ and motor speed (see Equation 2), can be derived across points C and D. The other end of lead 73 remote from point B is connected to point D through resistor 80. A lead 79 is connected between point C and the cathode 38 of control tube 40. Resistor 80 and capacitors 81 and 82 comprise a filter network for removing the alternating current ripple appearing along with the direct current opposing voltage derived in the armature circuit.

The equivalent input circuit for providing a variable grid-to-cathode potential for control tube 40 is shown in Fig. 2.

The first source of input voltage for control tube 40, represented as a generator 1, produces an alternating current across points E, F, which is displaced ninety degrees in phase with respect to the plate voltage of the tube.

The second source of input voltage, represented as a generator 2, produces a voltage across points A, B of Figs. 1 and 2. The value of this voltage is dependent upon the position of the particular arm of potentiometer unit 60 which is connected to lead 51. The position of point A, A', and so forth, is dependent upon which one of the microswitches is operated, which, in turn, is dependent upon the particular constant operating speed desired. For example, points A and A' correspond, respectively, to relatively high and relatively low motor operating speeds.

The third source of input voltage, represented in Fig. 2 as generator 3, is derived across terminals C and D of Figs. 1 and 2, and is proportional to motor speed, as already described. The polarity of the component of input voltage derived from this third source (generator 3) is opposite to that derived from the second source (generator 2).

Figs. 3a to 3c, inclusive, illustrate the effect of changes in input voltage to control tube 40 resulting from the changes in motor speed and load upon the output current of said tube. The plate voltage wave form is represented by $V_p$. The resultant direct-current input voltage, that is, the algebraic sum of the components of input voltage derived from sources 2 and 3 of Fig. 2, is indicated by $V_R$.

The system is so designed that the negative voltage $V_3$ from source 3 is always equal to or slightly higher than the positive voltage $V_2$ derived from source 2. The voltage difference for any given operating condition is dependent upon the gain of the system.

Superimposed on this resultant direct-current input voltage $V_R$ is the alternating current voltage derived from source 1 of Fig. 2 and indicated by reference numeral $V_g$; this voltage is of substantially constant amplitude and is shown as ninety degrees out of phase with the plate voltage. The wave form $V_g$ is the actual input voltage appearing between grid 42 and cathode 38 of control tube 40.

As is well known by those skilled in the art, conduction in a thyratron such as tube 40 does not commence until the grid voltage is more positive than a critical value equal to the negative of the ratio of plate voltage to grid voltage at breakdown. This critical grid voltage is shown by curve $V_c$. In general, at time $t_0$ the instantaneous grid voltage $V_g$ reaches the critical value shown by curve $V_c$ whereupon control tube 40 starts conducting. The grid then loses control and tube 40 continues to conduct until substantially the end of the half cycle of plate voltage. The plate current will flow over the portion of the cycle indicated by curve $I_p$. The average value of plate current may be determined by dividing the area under one loop by the time for one complete cycle.

It should be noted that the amplitude of the alternating current component $V_g$ of input voltage as shown in Fig. 3 is exaggerated in comparison with the amplitude of the plate voltage wave form $V_p$ for purpose of illustration. Moreover, the scale of current and voltage is not necessarily equal.

If the resultant direct current input voltage $V_R$ is as shown in Fig. 3a, the total input voltage $V_g$ never becomes sufficiently positive to effect conduction in control tube 40; consequently, the plate current in tube 40 is zero.

If the resultant voltage $V_R$ decreases, that is, becomes less negative, as shown in Fig. 3b, conduction in tube 40 commences at time $t_0$ at which the instantaneous total input voltage $V_g$ reaches the critical value shown by curve $V_c$. A small current $I_p$ then continues flowing for the remainder of the half cycle of plate voltage.

If now the resultant voltage $V_R$ is further decreased, as shown in Fig. 3c, the time $t_0'$ at which curve $V_g$ intersects curve $V_c$ is earlier than in Fig. 3b with the result that control tube 40 conducts over a larger portion of the half cycle.

If the voltage $V_3$ from source 3 increases owing to a decrease in load or an increase in speed, assuming that $V_2$ is kept contant at a value corresponding to a given setting of speed control potentiometers 60, the resultant direct current input voltage $V_R$ increases in a negative direction with consequently reduced conduction in control tube 40. As a result of this decrease in the average value of plate current—which is also the current flowing in control winding 28 of reactor 25—the impedance of the alternating current winding 27 in series with rectifier 30 increases and the proportion of the total line voltage appearing across the input of rectifier 30 is thereby reduced. The direct current output voltage of rectifier 30, and thus the motor voltage, decrease to compensate for the decrease in load or increase in speed, as the case may be.

If, on the other hand, the voltage $V_3$ were to decrease instantaneously owing to an increase in load or a decrease in speed, the voltage $V_R$ would become less negative and the control tube would conduct more heavily. The increased control current in control winding 28 would cause a reduction in impedance of the alternating current winding 27 of reactor 25 so that more voltage would appear across the rectifier and the motor voltage would increase to the original value. In other words, the motor voltage tends to adjust itself around the voltage $V_2$ which is dependent upon the setting of speed control potentiometer 60.

If an increase in a motor-operating speed is desired, the setting of potentiometer 60 is so adjusted that the voltage $V_2$ is increased. Assuming that the motor speed is not instantaneously drifting, the resultant direct current voltage $V_R$ becomes less negative and current in control tube 40 and control winding 28 increases. The impedance of alternating current winding 27 of reactor 25 thus decreases and voltage across rectifier 30 and motor M increases to the new desired value.

Similarly, if the motor is to operate at a lower speed, the voltage $V_2$ is decreased so that the resultant direct current voltage $V_R$ becomes more negative and the current in control winding 28 decreases.

It is evident, therefore, that the current in control winding 28 of saturable reactor 25 and the impedance of alternating current winding 27 may be changed in response to the setting of the speed control potentiometer unit 60, as well as in response to changes in voltage across points C, D, owing to instantaneous fluctuations in motor load or speed.

As the output voltage of rectifier 30 changes, the current flowing through series feed-back winding 29 of saturable reactor 25 in series with rectifier 30 and motor armature 10 also changes. Since the flux in core 26 of reactor 25 is dependent upon the number of ampere turns on the center leg, the feed-back winding 29 assists the control winding 28 in developing greater or less flux, as the case may be, in the reactor core 26. The feed-back winding 29 thereby reduces considerably the current and energy requirements for control winding 28 to obtain full range of operation for a given saturable reactor; in other words, the gain of the system is increased considerably by use of the feed-back winding.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A direct current motor speed control system comprising a motor having an armature and a field, an alternating current supply, a variable reactance device having first and second portions, a rectifier having an input circuit and an output circuit, circuit means for serially connecting said first portion of said variable reactance device and said rectifier input circuit across said alternating current supply, means for connecting said motor armature to said rectifier output circuit for energizing said armature, a control electron discharge device having an input circuit and an output circuit, said second portion of said variable reactance device being included in said output circuit of said control device, said input circuit of said control device including a first energy source productive of a direct current voltage which is a function of instantaneous motor speed, a second energy source in series with said first energy source and across which a speed-controlling potentiometer is connected for producing an adjustable direct current voltage corresponding to the predetermined desired motor operating speed, and a third energy source productive of an alternating current voltage of fixed phase and magnitude, said second portion of said variable reactance device being responsive to changes in said input circuit for varying the impedance of said first portion of said variable reactance device by an amount capable of maintaining constant said motor speed.

2. A direct current motor speed control system comprising a motor having an armature and a field winding, an alternating current supply, a saturable core reactor having a reactance winding and a control winding, a rectifier having a pair of input terminals and a pair of output terminals, means for serially connecting said reactance winding and said rectifier input terminals across said alternating current supply, means for connecting said motor armature to said rectifier output terminals for energization of said armature, a control electron discharge device having an input portion and an output portion, said control winding being connected in the output portion of said control device, said input portion of said control device including a first energy source productive of a direct current voltage which is a function of instantaneous motor speed, a second energy source for producing an adjustable direct current voltage corresponding to a predetermined desired motor operating speed, and a third energy source for producing an alternating current voltage, said control winding being responsive to changes in said input portion of said control device for varying the impedance of said reactance winding of said saturable reactor by an amount sufficient to effect a constant motor speed.

3. A direct current motor speed control system comprising a motor having an armature and a field winding, an alternating current supply, a saturable core reactor having a reactance winding and a control winding, a rectifier having a pair of input terminals and a pair of output terminals, means for serially connecting said reactance winding and said rectifier input terminals across said alternating current supply, means for connecting said motor armature to said rectifier output terminals for energization of said armature, a gaseous electron discharge control device having at least an anode, a grid, and a cathode, a source of alternating current anode voltage, a source of alternating current grid voltage whose output is displaced in phase by a fixed amount from the output of said source of anode voltage, said control winding being connected in the anode circuit of said electron discharge device, biasing means for said control device including a first energy source productive of a direct current voltage which is a function of instantaneous motor speed, a second energy source across which a speed-controlling potentiometer is connected for producing an adjustable direct current voltage corresponding to a predetermined desired motor operating speed, and said source of alternating current grid voltage, said control winding being responsive to changes in said biasing means for varying the impedance of said reactance winding of said saturable reactor in response to instantaneous changes in motor speed to thereby effect a constant motor speed.

4. A direct current motor speed control system comprising a motor having an armature and a field winding, an alternating current voltage supply, a saturable reactor having a reactance winding and a control winding for effecting variation in the impedance of said reactance winding, a rectifier having input and output circuits, means for serially connecting said reactance winding and said rectifier input circuit across said supply, energizing means including said rectifier output circuit for energizing said armature, a gaseous electron discharge device comprising at least an anode, a grid, and a cathode and having a critical firing potential, first circuit means including a rectifying device and a potentiometer connected across said supply for deriving a direct current reference voltage proportional to a predetermined desired motor-operating speed, second circuit means coupled to said supply and including a phase shifter for deriving an alternating current voltage whose phase is shifted a fixed amount relative to said anode voltage, third circuit means including said energizing means for deriving a direct current voltage proportional to the instantaneous speed of said motor, biasing means for said electron discharge device including said first, second and third circuit means serially connected between said cathode and said grid to produce current variations in the output circuit of said electron discharge device, said control winding being connected in series with said output circuit and responsive to said current variations for effecting a variation of impedance of said reactance winding of said saturable reactor in response to instantaneous changes in motor speed to maintain constant the speed of said motor.

5. A direct current motor speed control system comprising a motor having an armature and a field winding, an alternating current voltage supply, a saturable reactor having a reactance winding, a control winding for effecting variation in the impedance of said reactance winding and a feed-back winding, a rectifier having input and output circuits, means for serially connecting said reactance winding and said rectifier input circuit across said supply, energizing means including said rectifier output circuit and said feed-back winding serially connected for energizing said armature, a gaseous electron discharge device comprising at least an anode, a grid, and a cathode and having a critical firing potential corresponding to the voltage on said anode, first circuit means including a rectifying device and a potentiometer connected across said supply for deriving a direct current reference voltage proportional to a predetermined desired motor-operating speed, second circuit means coupled to said supply and including a phase shifter for deriving an alternating current voltage whose phase is shifted a fixed amount relative to said anode voltage, third circuit means including said energizing means for deriving a direct current voltage proportional to the instantaneous speed of said motor, biasing means including said first, second and third circuit means serially connected between said cathode and said grid of said electron discharge device to produce variations of current in the anode circuit thereof, said control winding being connected in series with said anode circuit and responsive to said variations in current and to the current in said feed-back winding for effecting a variation of impedance of said reactance winding of said saturable reactor in response to instantaneous changes in motor speed to maintain constant the speed of said motor.

References Cited in the file of this patent

UNITED STATES PATENTS

| Number | Name | Date |
| --- | --- | --- |
| 2,482,101 | Cooper | Sept. 20, 1949 |
| 2,552,206 | Moyer | May 8, 1951 |
| 2,558,086 | Herchenroeder | June 26, 1951 |
| 2,558,094 | King | June 26, 1951 |
| 2,572,824 | Wilkins | Oct. 23, 1951 |
| 2,600,003 | Knauth | June 10, 1952 |